April 1, 1969   M. B. GOLANT ETAL   3,436,690
SLOW WAVE STRUCTURE FOR TUBES COMPRISING A STACK OF METAL
LAMINATIONS PARALLEL TO THE AXIS OF THE ELECTRON BEAM
Filed Oct. 27, 1966

United States Patent Office 3,436,690
Patented Apr. 1, 1969

3,436,690
SLOW WAVE STRUCTURE FOR TUBES COMPRISING A STACK OF METAL LAMINATIONS PARALLEL TO THE AXIS OF THE ELECTRON BEAM
Mikhail Borisovich Golant, Ulitsa Vokzalnaya 17, kv. 137; Alexandr Andreevich Negirev, Ulitsa Institutskaya 8, kv. 53; Alexandr Semenovich Tager, Ulitsa Komsomolskaya 20–a, kv. 8; Alexandr Sergeevich Pobedonostsev, Ulitsa Institutskaya 29, kv. 12; Elena Aristarkhovna Zjulina, Ulitsa Institutskaya 27, kv. 7; and Galina Alexandrovna Samorodova, Ulitsa Institutskaya 12, kv. 7, all of Fryazino, Moskovskoi oblasti, U.S.S.R.
Filed Oct. 27, 1966, Ser. No. 589,909
Int. Cl. H03h 7/30; H01j 25/34
U.S. Cl. 333—31    2 Claims

ABSTRACT OF THE DISCLOSURE

A multi-row retarding line unit for tubes comprising a stack of metal laminations arranged in intimate contact and soldered together and having different shape apertures forming passages for an electron beam, the plane of the laminations being parallel to the longitudinal axis of the electron beam.

---

The present invention relates to microwave tubes designed for operation in millimeter and submillimeter wave ranges, and more particularly, to the multirow retarding line unit of said tubes.

In millimeter and submillimeter wave ranges use is made at present mostly of the tube types previously employed in a centimeter wave range. It was found that the most suitable devices to be utilized in these ranges are backward-wave oscillators. However, the possibility of manufacturing tubes of the above types operating in shortwave ranges and parameters thereof considerably depend on their design and, in particular, on the design of their retarding line units.

Known at present are multirow retarding line units of pin-, lamination-, and other types representing a series of parallel-located rows. There are also known retarding line units assembled of laminations with holes of different shapes, the plane of said laminations being perpendicular to the axis of the electron beam.

The main difficulties in the manufacture of such units designed to operate in millimeter and submillimeter ranges are the complications in the construction of quite identical retarding line rows in multirow retarding line assemblies, the arrangement of retarding line rows at quite exact distances from one another, the elimination of possible deformations in the process of manufacturing, the provision of adequate heat removal from the most heat-strained areas of retarding line assemblies, a convenient means of power output and a good reproducibility of a high-frequency energy absorber coating, as well as complications in providing a minimum length of the tube with maximum interaction efficiency. It should be particularly noted that there exists the difficulty in the manufacture of broadband retarding lines, e.g. of interdigital type, designed to operate in the shortwave subrange of the millimeter wave range and in the submillimeter wave range.

It is an object of the present invention to provide a retarding line unit simple in manufacture, making it possible to avoid deformation of the rows and to ensure identical retarding lines in separate rows, as well as correct arrangement of rows relative to one another.

It is another object of the present invention to provide a retarding line unit with good heat removal.

It is still another object of the invention to provide a retarding line unit with a convenient power output and minimum axial length.

It is a further object of the invention to provide a retarding line unit of such a design which will permit manufacturing retarding lines of any shape, including broadband lines of interdigital type.

With the above and other objects in view the present invention consists in a retarding line assembly made as a stack of laminations arranged in intimate contact, with different-shape holes forming a multirow retarding line having longitudinal passages to pass an electron beam, means for power output, a final absorber inclined with regard to the retarding line axis, the plane of said laminations being approximately parallel to the electron beam axis.

Other objects and advantages of the invention will become more evident upon a consideration of the following detailed description taken in conjunction with the accompanying drawings, in which.

Figure 2:
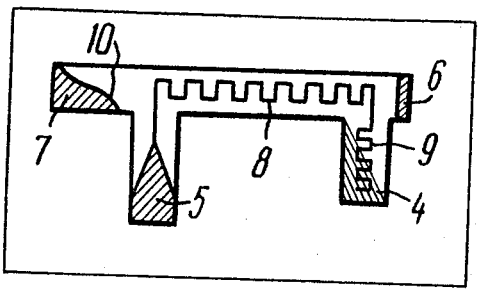
FIG. 2 is a longitudinal section of the retarding line assembly.
Figure 1:
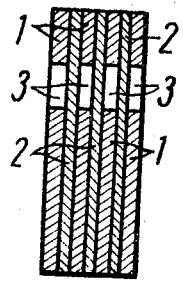
FIG. 1 is a cross-section of an exemplary retarding line laminated assembly made in accordance with the invention.
Figure 3:
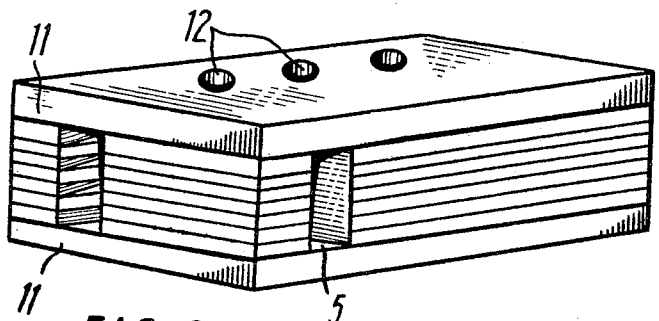
FIG. 3 is an assembled retarding line unit.

The retarding line unit is essentially an assembly of laminations 1 and 2, arranged in an intimate contact, said laminations 1 having apertures forming passages 3 in the assembly for an electron beam; passages between the layers of the absorber 4 on the laminations 2, aperture 5 for the transformer and waveguide of power output. To closely couple laminations 1 and 2, said laminations are provided with additional holes (not shown on the drawings). Additionally, laminations 2 have holes 6 and 7 which make it possible to trim, later on, the laminated assembly without causing damage to said passages and separate retarding line rows. Prior to assembly, laminations 1 are covered with a thin coat of solder enabling reliable final connection of said laminations into one unit.

After coupling laminations 1 and 2, retarding line 8, aperture 5 of the power output transformer (the exact shape), retarding line 9 of final absorber 4 and heat distribution bevel 10 are made in all laminations 2 simultaneously by photoetching, electrosparking, electrochemical or other method which is not associated with a substantial mechanical effect upon the laminations. Prior to or after making all said lines of the retarding line assembly, and the above mentioned apertures and bevels, the laminations are soldered together with solder galvanically applied to the lamination surfaces. Soldered at the top and bottom of the retarding line lamination stack are flanges 11 which may be provided with holes 12 for control of retarding lines. After that, the side portions of the laminated assembly are cut off so that passages 3 for passing an electron beam and power output aperture 5 are opened externally. High-frequency absorber 4 may be coated on the retarding line 9 inclined with regard to the axis of electron beam either before soldering flanges 11, or after their soldering through the holes in said flanges (not shown on the drawings).

The identical retarding lines of the unit and their correct mutual arrangement are ensured by their simultaneous manufacture in the already assembled lamination stack. This also ensures that there occur no phase shifts between retarding line rows.

The retarding line in such an assembly may be of any shape provided the elements in the rows thereof are disposed in the same plane. Strains and deformations are avoided since all the laminations are made of one and the same metal, whereas the width of passages 3 is relatively small. The small distance by which the retarding line elements are spaced from the solid portion of the entire assembly ensures reliable heat removal.

The disposition of the final absorber 4 on the surfaces 9 inclined with regard to the axis of the electron beam permits decreasing the axial length of the unit, which is of particular importance in reducing the weight of the magnetic focusing system, and protects the absorber from being affected by the electron beam.

Of great importance for the millimeter and submillimeter tubes is a reliable heat removal from the retarding line input. To reduce the heating effect, the electron beam is distributed or scattered over a large surface of retarding elements onto which it falls.

Figure 4:
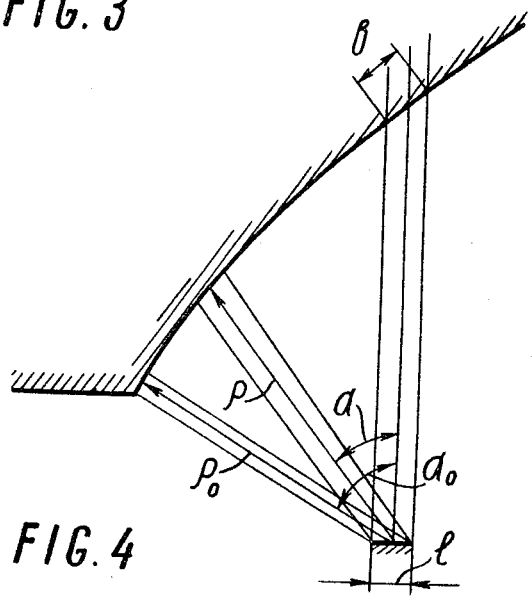
FIG. 4 is a diagram explaining the formula used to calculate the shape of the bevelled surface at the retarding line input.

The scattering is effected by providing the bevels 10 at the input. It is sometimes essential that, with an angular shift of the beam, in the course of adjustment in the magnetic field, the rate of its distribution over the surface be constant and the total axial length of the scattering area minimized. The surface satisfying these requirements is approximately the same as that expressed by the formula (see FIG. 4):

$$\frac{\rho}{\rho_0} = \left\{ \tan \left[ \frac{\alpha_0 - \alpha}{2} + \frac{\pi}{4} \right] \right\}^\gamma$$

where $l$ is the width of electron beam;
B is the length of a curved surface over which an electron beam of width $l$ is to be scattered;
$\gamma = B/l$ is a beam scattering factor;
$\alpha$ is a polar angle;
$\alpha_0$ is a maximum angle of electron beam deviation;
$\rho$ is the distance from the central point of the beam turn to any point on the curve; and
$\rho_0$ is $\rho$ corresponding to $\alpha_0$.

Although the present invention is described with reference to the backward wave tube, the retarding line of the present invention may also be employed, with some non-essential alterations and changes introduced, in travelling wave tubes or klystrons. In case of klystrons, resonators are to be substituted for a retarding line.

What we claim is:

1. A multirow retarding line unit for tubes designed to operate in millimeter and submillimeter wave ranges comprising a stack of metal laminations arranged in an intimate contact and soldered together and having different-shape apertures forming passages to pass an electron beam, a final absorber in the form of a branch of a multirow retarding line, said branch being inclined with regard to the axis of said line in the planes of location of the line rows, the planes of said metal laminations being approximately parallel to the axis of the electron beam.

2. A multirow retarding line unit for tubes designed to operate in millimeter and submillimeter wave ranges comprising a stack of metal laminations arranged in an intimate contact and soldered together and having different-shape apertures forming passages to pass an electron beam, a final absorber in the form of a branch of a multirow retarding line, said branch being inclined with regard to the axis of said line in the planes of location of the line rows, the planes of said metal laminations being approximately parallel to the longitudinal axis of the electron beam, said laminations being bevelled on the side of the cathode, said bevels increasing the total area onto which the electron beam falls and their shape providing a practically constant level of the beam scattering at the input irrespective of changes in the electron beam direction angle.

References Cited

UNITED STATES PATENTS 3,353,058   11/1967   Froom _____ 333—31 X

ELI LIEBERMAN, *Primary Examiner.*

P. L. GENSLER, *Assistant Examiner.*

U.S. Cl. X.R.

315—3.5